United States Patent
Reynolds

(10) Patent No.: US 8,677,603 B1
(45) Date of Patent: Mar. 25, 2014

(54) DROP MAKER FOR SAP COLLECTION SYSTEM

(76) Inventor: Stanley James Reynolds, Waterville, VT (US)

( * ) Notice: Subject to any disclaimer, the term of this patent is extended or adjusted under 35 U.S.C. 154(b) by 562 days.

(21) Appl. No.: 12/931,857

(22) Filed: Feb. 12, 2011

Related U.S. Application Data

(60) Provisional application No. 61/337,971, filed on Feb. 12, 2010.

(51) Int. Cl.
*B23P 21/00* (2006.01)

(52) U.S. Cl.
USPC ............. 29/564.6; 29/33 T; 29/33 D; 29/565; 29/237; 29/267; 29/268; 29/281.1; 30/92

(58) Field of Classification Search
USPC ....... 29/33 D, 33 T, 564.6, 564.2, 564.1, 565, 29/56.6, 237, 267, 268, 281.3, 281.1; 30/92; 7/157, 163; 83/54, 633, 634
See application file for complete search history.

(56) References Cited

U.S. PATENT DOCUMENTS

| | | | | |
|---|---|---|---|---|
| 3,874,048 A | * | 4/1975 | Millar et al. | 29/33 T |
| 5,224,289 A | * | 7/1993 | Buzzell | 47/52 |
| 5,305,669 A | * | 4/1994 | Kimbro et al. | 81/423 |
| 6,237,204 B1 | * | 5/2001 | Hoglund et al. | 29/33 D |
| 6,389,675 B1 | * | 5/2002 | Tykoski et al. | 29/468 |
| 6,581,262 B1 | * | 6/2003 | Myers | 29/268 |
| 7,185,409 B1 | * | 3/2007 | Myers | 29/268 |
| 7,966,681 B2 | * | 6/2011 | Harris | 30/92 |
| 2006/0254057 A1 | * | 11/2006 | Houseman et al. | 30/92 |
| 2011/0302764 A1 | * | 12/2011 | Smith | 29/237 |

FOREIGN PATENT DOCUMENTS

JP 06-155194 A * 6/1994

* cited by examiner

*Primary Examiner* — Erica E Cadugan
(74) *Attorney, Agent, or Firm* — Howard J Walter

(57) ABSTRACT

Tool for forming drop tube connectors for connecting between a sap producing sugar maple tree and a collection conduit by providing for the measurement, cutting and application of fixture fittings within a single unit. The cutting and fixture application features are actuated by a single operating lever. Operation of the tool can be facilitated indoors or out, allowing a single drop to be made in the field or thousands of drops to be made indoors.

5 Claims, 4 Drawing Sheets

DROP MAKER FOR SAP COLLECTION SYSTEM

CROSS REFERENCE TO RELATED APPLICATIONS

This application claims priority in Provisional U.S. Application No. 61/337,971 filed Feb. 12, 2010.

TECHNICAL FIELD AND INDUSTRIAL APPLICABILITY OF THE INVENTION

This invention relates to tools used in the collection of sap from sugar maple trees and particularly to a tool for fabricating plastic tubing for connecting a primary collection tube to a tree from which sap is to be collected.

BACKGROUND OF THE INVENTION

The collection of sugar maple sap for the purpose of creating maple syrup has long been practiced in the northern portions of the North America. Traditionally, sap was collected in buckets attached to maple trees and collected individually by hand. In recent years the collection of sap has been facilitated by the use of a system of conduits connected to a number of trees which lead to a collection station down hill from the farthest tree. Each tree is connected to a branch conduit by one or more tubes called "drops." The drops are preferably made of plastic tubing connected at one end to a tap or spout placed in a tree and at the other end to the main or branch conduit by fittings of various configuration. For example, a T-shaped fitting can be used to connect a drop to a main or branch conduit.

In the spring, when the out door temperatures rise above freezing during the day and fall below freezing at night, the sap begins to rise in the sugar maple trees and the system of conduits must be connected between each tree in a sugar bush. There could be hundreds or thousands of trees which need to be connected to the main or branch conduit. For each tree, at least one drop is required. Creating these drops is a labor intesive job which could take many hours.

There are available in the industry numerous hand tools to facilitate the fabrication of drops based on various clamping pliers-like gripping or clamping tools many of which require both hands to operate. There is a need for a universal tool which can be used indoors and in the field.

BRIEF SUMMARY OF THE INVENTION

It is an object of the invention to provide a drop maker tool which can be used easily in doors or outdoors.

It is another object to provide a drop maker tool which measures, cuts and assembles fittings.

It is yet another object of the invention to provide a tool which can be operated with one hand.

These and other objects are accomplished by providing a tool having means to measure the length of a drop, cutting to a desired length and forcing a desired fitting into one or both ends of the cut drop. All of these features are mounted as a single unit on a supporting base which can be clamped to a support. Operation of the cutting and clamping feature is accomplished by use of a single hand operated lever.

These and other objects are accomplished in accordance with the following description of the preferred embodiment of the invention as illustrated in the following drawings.

DETAILED DESCRIPTION OF THE INVENTION

Figure 1A:
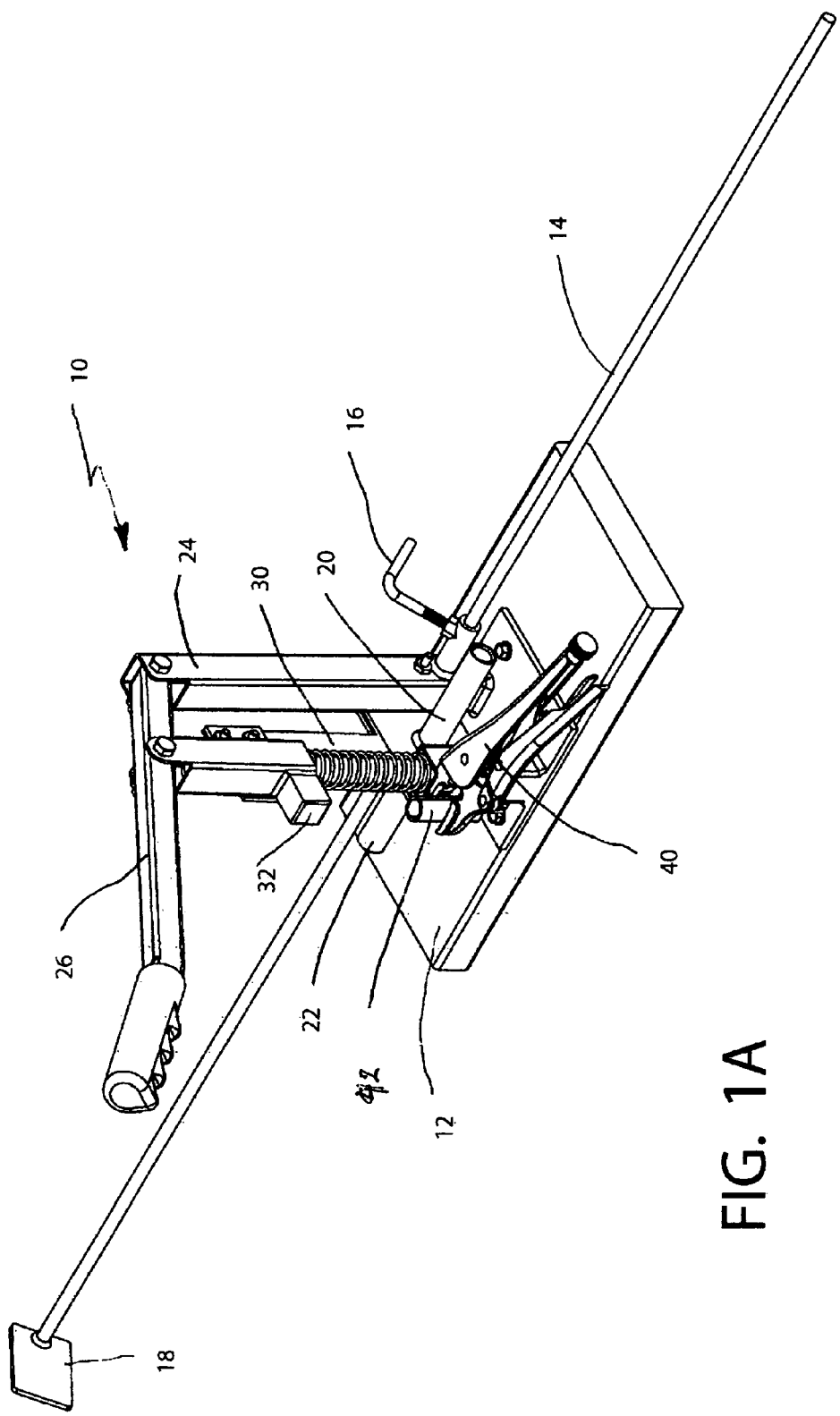
FIGS. 1A and 1B are isometric views of the invention showing the several features including the measuring, cutting and compression elements.
Figure 1B:
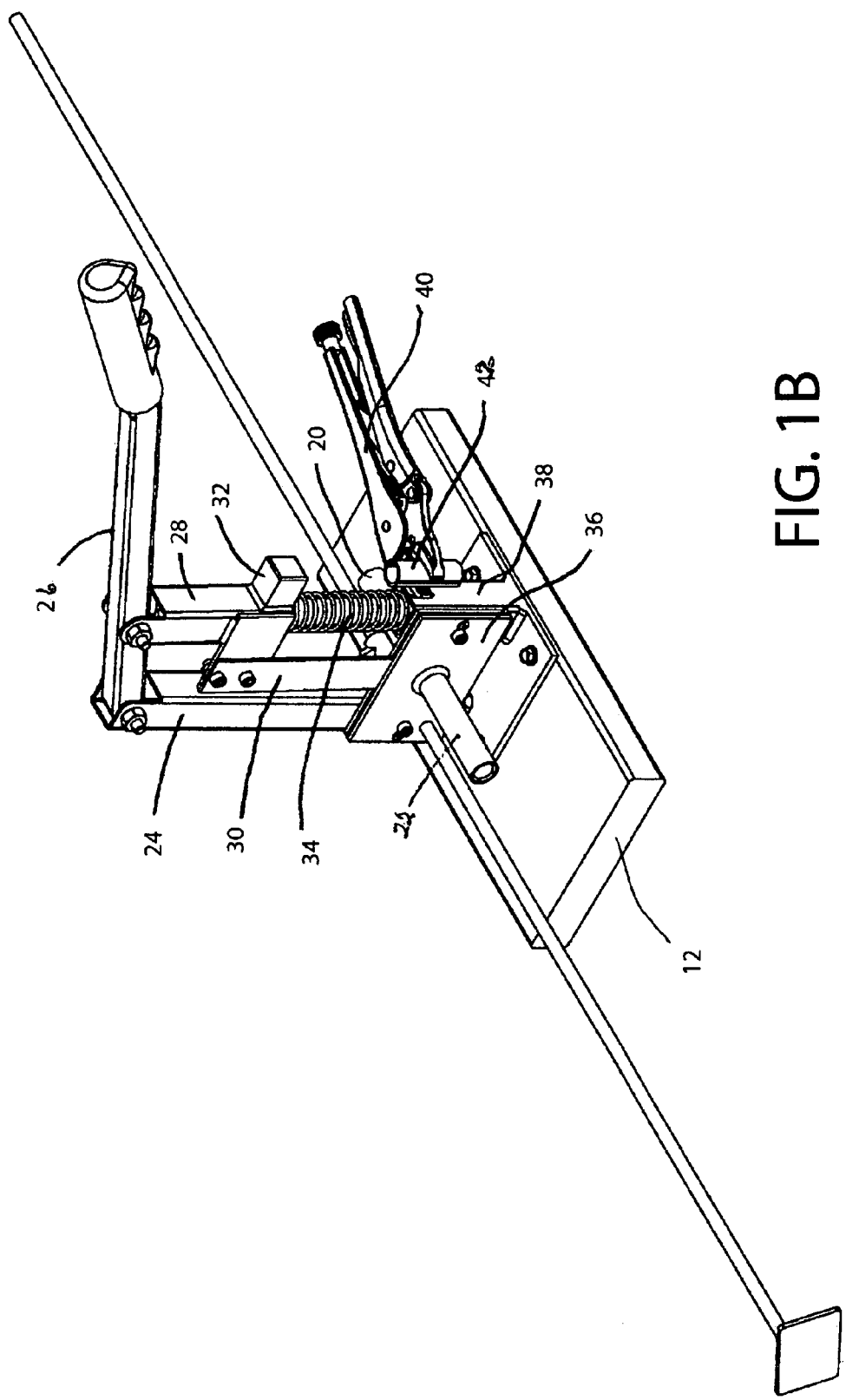

Referring to FIGS. 1A and 1B there is shown the drop assemble tool 10. The entire assembly is mounted on a base 12 formed of wood or other stable material capable of being clamped to a solid work surface such as a work bench, table or tailgate of a truck or other vehicle.

Mounted on base 12 are the remaining features of the invention including a tubing length measuring device consisting of extendable bar 14 passing through a clamping means having a locking handle 16. Mounted at the end of bar 14 is a stop plate 18.

Referring now to FIG. 1B, mounted on base 12 is tube support and cutting assembly 36 (see also FIG. 2) including tube inlet support 20 and tube exit support 22.

Mounted on base 12 is a pillar 24 to which operating lever 26 is attached at its uppermost end. Mounted on operating lever 26 is anvil and blade support 28 which, in turn, supports tube cutting blade 30 and fitting compression anvil 32. Spring 34 mounted under support 28 returns operating lever 26 to its uppermost position. Spring 34 is in turn mounted on a secondary support pillar 38. Mounted on pillar 38 is tube and fitting clamping device 40 which can be a modified locking pliers tool of any convenient design. Welded to the jaws of clamping device 40 is a split gripping fixture 42 (See FIG. 4 for additional detail.).

Figure 2:
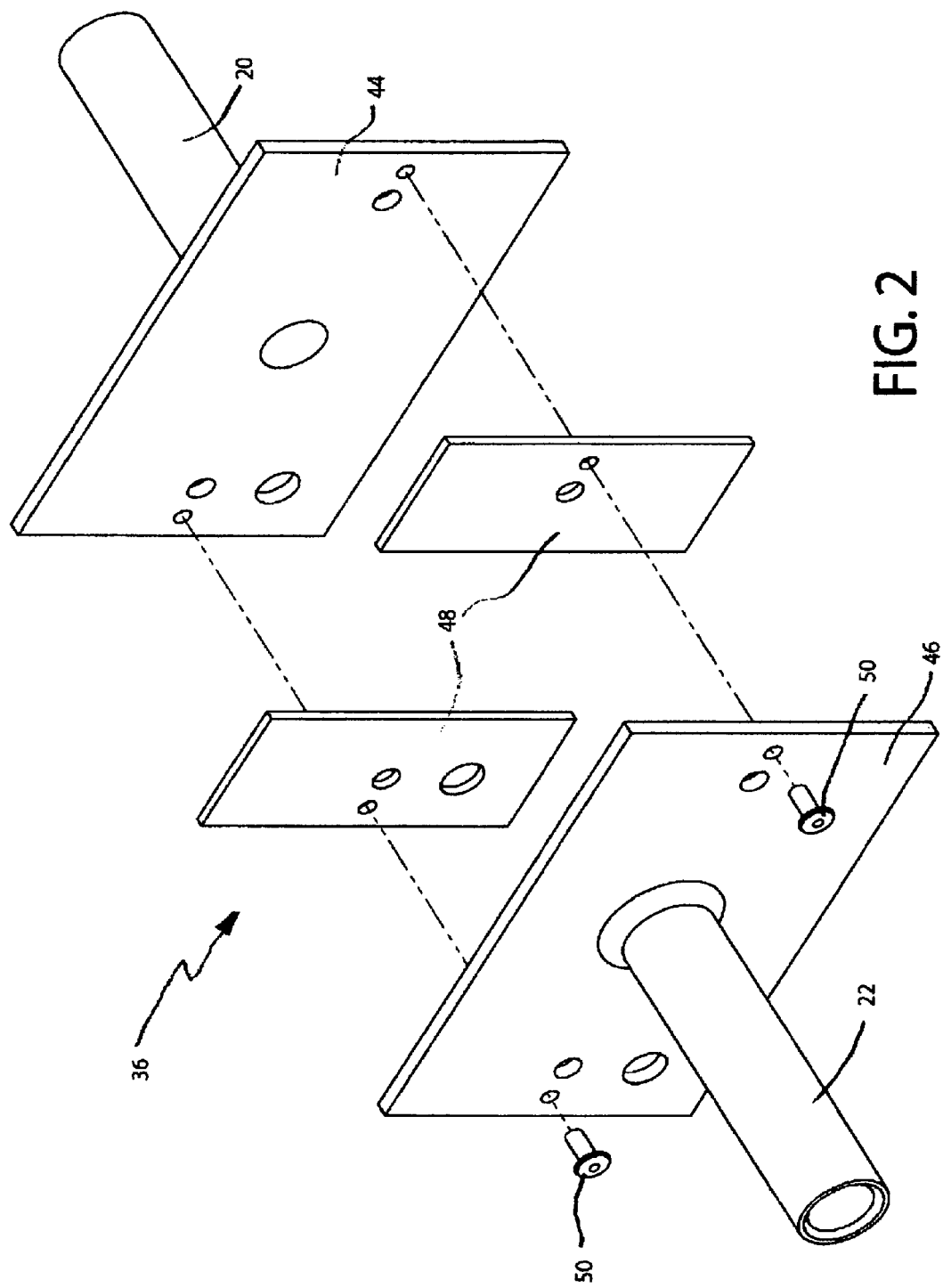
FIG. 2 is an exploded isometric view showing the details of the central support and cutting assembly of the invention.

FIG. 2 shows detail of tube and cutting blade supporting assembly 36 which includes inlet support plate 44 including inlet support tube 20, and exit support plate 46 including exit support tube 22. Spacers 48 are provided to provide a guide for guillotine blade 30 (See FIGS. 1B and 3). The assembly is held together by rivets 50.

Figure 3:
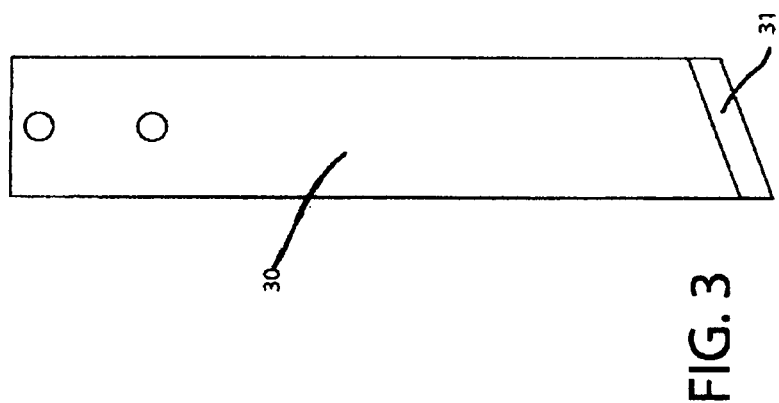
FIG. 3 is a side view of the guillotine-like blade used to sever a drop from a source of plastic tubing.

FIG. 3 shows a side view of tube cutting blade showing the bevel cutting edge 31 allowing the blade to slice through the drop tubing without crushing.

Figure 4:
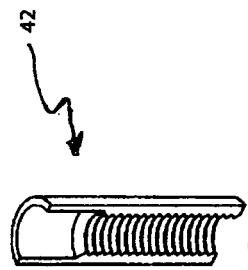
FIG. 4 is an isometric view of the detail of the jaws of the clamping tool showing the interior shape cut to allow expansion of the tubing when the fitting is inserted.

FIG. 4 is an isometric view of the interior on one-half of the gripping fixture 42 showing lower gripping surface and the upper larger diameter region to allow the end of the plastic tubing to expand with the insertion of a fitting (not shown). The gripping fixture 42 is fabricated by providing a piece of steel pipe with the interior tapped with coarse threads and then having the top portion drilled or reamed out to remove the threads for a distance equal to the length of the mounting portion of the fittings desired. Then the finished pipe is cut in two and the pieces attached to the jaws of the locking pliers, preferably by spot welding.

Several sequential steps are necessary in order to make a sap collecting drop.

First, the measuring bar 14 is adjusted to the length of tubing needed to form the drop and the locking handle 16 is tightened. Next, an uncut piece of plastic tubing is passed through the inlet support tube 20 and the exit support tube 22 until the cut end of the plastic reaches the stop plate 18. The operating lever 26 is then depressed slicing the tubing smoothly while the inlet and exit support tubes 20 and 22 prevent the ends of the tubing from falling away from the assembly.

Next, the now severed drop is placed in the jaws 42 of the locking pliers so that the top of the tubing is even with the top of jaws 42. A fitting desired to be attached to the tubing is then placed partially in the open end of the tubing. The operating lever 26 is then depressed a second time causing the anvil 32 to press the fitting into the tube. The handle is then released allowing the spring 34 to return to its normal position.

While the invention is described in terms of a single preferred embodiment, those skilled in the art will recognize that various changes could be made within the scope of the invention as claimed.

What is claimed is:

1. A tool for fabricating drop tubes for use in the collection of sap comprising:
   a base capable of being mounted on a stable surface;
   adjustable measuring means mounted on said base for measuring the length of plastic tubing to be formed into a drop tube;
   tube cutting means mounted on said base for cutting a measured length of plastic tubing;
   tube clamping means mounted on said base for clamping a piece of cut tubing in a position to accept a tube coupling fitting; and
   an operating lever mounted on said base, said lever being hinged at one end and being connected for operating said cutting means and having an anvil portion positioned over said tube clamping means whereby when said lever is actuated, tubing placed at said cutting means can be cut and a tube coupling fitting can be forced by said anvil portion into a piece of tubing clamped in said clamping means.

2. The tool of claim 1 wherein said measuring means comprises:
   an adjustable rod of a predetermined length having a stop plate at one end, said rod being capable of being adjustably clamped at a location along its length such that the distance of the stop plate from a portion of the cutting means corresponds to the desired length of a drop tube to be fabricated.

3. The tool of claim 1 wherein said tube cutting means comprises guillotine-like blade mounted between inlet and exit plates, said blade being fixed at its upper end to said operating lever.

4. The tool of claim 3 wherein said inlet and exit plates include tubing support tubes of sufficient length to prevent ends of the tubing from falling away from the tool after being cut.

5. The tool of claim 1 wherein said clamping means comprises a locking pliers having jaws adapted to accommodate a split pipe, said pipe having a first portion of its interior containing threads and a second portion reamed out to allow the expansion of the plastic tubing when a tube coupling fitting is pressed into the clamped tubing.

* * * * *